(12) United States Patent
Takizawa

(10) Patent No.: US 7,239,964 B2
(45) Date of Patent: Jul. 3, 2007

(54) METHOD AND APPARATUS FOR DISPLAYING A MAP

(75) Inventor: Akihiko Takizawa, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 127 days.

(21) Appl. No.: 10/943,408

(22) Filed: Sep. 17, 2004

(65) Prior Publication Data

US 2005/0090977 A1 Apr. 28, 2005

(30) Foreign Application Priority Data

Sep. 22, 2003 (JP) ............................. 2003-329963

(51) Int. Cl.
*G01C 21/30* (2006.01)

(52) U.S. Cl. ...................... 701/211; 701/208; 701/212; 340/990; 340/995.15

(58) Field of Classification Search ................ 701/207, 701/208, 209–210, 211, 212; 73/178 R; 340/988, 990, 995.15, 995.17, 995.23

See application file for complete search history.

(56) References Cited

U.S. PATENT DOCUMENTS 6,333,702 B1 * 12/2001 Hiyokawa et al. ..... 340/995.21
6,747,680 B1 6/2004 Igarashi et al. ............. 715/784

FOREIGN PATENT DOCUMENTS

JP 2000222559 A * 8/2000

* cited by examiner

*Primary Examiner*—Gertrude A. Jeanglaude
(74) *Attorney, Agent, or Firm*—Brinks Hofer Gilson & Lione

(57) ABSTRACT

A navigation apparatus and method of displaying a map are provided for scrolling and displaying the map covering the vicinity of a present position such that a relationship with the present position can be constantly recognized.

When a request for a surrounding scroll starting operation is accepted from a user, a display range is moved upward until the present position is located in the center of a lower hem of the display range of the map, that is, until an upper half of a present position mark is positioned in the center of a bottom of the display range. Then, the display range is moved in stages, i.e. in such a manner that the present position is moved to a lower left edge thereof, to an upper left edge thereof, to an upper right edge thereof, and to a lower right edge thereof, in this order. Thereafter, the display range is gradually moved rightward until the present position is located in the center of the lower hem of the display range. Finally, the display range is gradually moved downward until the present position returns to the original position located before starting the first surrounding scroll process.

19 Claims, 9 Drawing Sheets

METHOD AND APPARATUS FOR DISPLAYING A MAP

BACKGROUND OF THE INVENTION

1. Field of the Invention

The present invention relates to the display of maps and information about a present position on the map on a navigation apparatus.

2. Description of the Related Art

A navigation apparatus mounted on a vehicle may be used to guide a user in traveling from one location to another. A display may be used to present a map of an area and a mark indicating the present position of the vehicle. The navigation apparatus may also include guidance technology that allows a user to set a designation and will in turn set a guidance route to the accepted destination, and guide the user along the set guidance route.

Other technology, known as altering (or scrolling), may also be used in displaying a map in a navigation apparatus. Various user operations, such as moving the cursor, or scrolling the map, or the like, may use altering. As disclosed in Japanese Patent Laid-Open Nos. 2000-292194 and 2002-81942 Publications, a map of the area covering the present position may displayed while allowing for scrolling of the range or area of the map displayed in accordance with the user operations. Such altering technology of the map range displayed may be used to allow the user to scroll the displayed map range until an area covering a desired location is entirely displayed, thus allowing the user to set the destination.

A map depicting the present position and its surroundings often needs to be recognized in details over a little wider range than the range being currently displayed. For example, a user may wish to locate the exact position of a facility on a map when he/she reaches the vicinity of the facility, even though the user may only vaguely remember the exact position of the facility. Alternatively, a user may be searching for a convenience store. In such cases, if a map display scale is rendered small, a map covering a wider range of the vicinity of the present position can be displayed. This, however, results in degradation of the degrees of detail of the map or of visibility thereof, so that the map cannot be recognized in more detail.

In these situations, application of conventional scrolling technology for scrolling the map range displayed allows for movement of the map display range with a display scale kept large. Movement of the map, however, causes the map display range to be moved to an area that does not include the present position while the user is scrolling the map range. As a result, a positional relationship between the map display range being currently displayed and the present position is missed by the user.

SUMMARY OF THE INVENTION

Accordingly, it is an object of the invention to allow display of a map covering the vicinity of a present position as widely as possible so that the user can recognize a relationship with the present position.

To solve the foregoing problems, according to one aspect of the present invention, a navigation apparatus to be mounted on a vehicle is provided with a map image displaying device for displaying a partial map which is within a display range set on a map, as a guidance map image, and scrolling device for moving the display range on the map in such a manner that a predetermined position on the map is moved from one end to the other of the display range in at least one of longitudinal and lateral directions of the map without departing from the display range in accordance with a user's prescribed operation.

With this arrangement, the navigation apparatus can provide the user with a map covering the predetermined position and its surroundings over a wider range than an area covering the display range previously set, by taking the form of scrolling and displaying the guidance map image as long as the predetermined position does not depart from the display range, that is, as long as the user directly recognizes a relationship with the predetermined position from the guidance map image.

In such a navigation apparatus, the map image displaying device, when the predetermined position is included within the display range, may display the partial map as the guidance map image, together with a position mark representing the predetermined position on the partial map, and the scrolling means may move the display range on the map in the at least one of longitudinal and lateral directions of the map by a maximum amount that the entire position mark is capable of existing within the display range without departing from the display range in accordance with the user's prescribed operation.

This permits the guidance map image to be scrolled and displayed with the predetermined position constantly expressed by the mark so that the user can identify the guidance map image, directly recognizing the relationship with the predetermined position.

In such a navigation apparatus, the scrolling device may move the display range on the map such that the predetermined position goes round the display range along its sides on the map.

This can efficiently provide the user with the map covering the predetermined position and its surroundings over a wider range in both longitudinal and lateral directions by executing a scroll sequence, which seems natural to the user.

Further, in the above-mentioned navigation apparatus, the scrolling device may set a display scale of the partial map serving as the guidance image to a predetermined scale in moving the display range.

Such a navigation apparatus facilitates the user's identifying the map of the vicinity of the predetermined position from the guidance map image by previously setting the predetermined scale to a value suitable for identification of the map.

Moreover, the above-mentioned navigation apparatus may comprise a present position calculating device for calculating the present position, and the predetermined position may be the present position calculated by the present position calculating means. In this case, the aforesaid position mark is a mark representing the present position.

This can provide the user with the map covering the present position and its surroundings over a wider range than an area covering the display range previously set, by taking the form of scrolling and displaying the guidance map image as long as the present position does not depart from the display range, that is, as long as the user directly recognizes a relationship with the present position from the guidance map image.

The above-mentioned navigation apparatus may further comprise the present position calculating device for calculating the present position, and guidance route searching device for searching for a route from the present position calculated by the present position calculating device to the destination designated by the user as a guidance route, and the predetermined position may be the destination. In this case, the position mark is a mark representing the destination.

This can provide the user with the map covering the destination and its surroundings over a wider range than an area covering the display range previously set, by taking the form of scrolling and displaying the guidance map image as long as the destination does not depart from the display range, that is, as long as the user directly recognizes a relationship with the destination from the guidance map image.

In the above navigation apparatus, the predetermined position may be a position of a facility designated by the user. In this case, the position mark is a mark representing the facility designated by the user.

This can provide the user with the map covering the vicinity of the facility arbitrarily designated by the user over a wider range than an area covering the display range previously set, by taking the form of scrolling and displaying the guidance map image as long as the position of the facility does not depart from the display range, that is, as long as the user directly recognizes a relationship with the position of the facility set by himself/herself from the guidance map image.

Moreover, the above-mentioned navigation apparatus may comprise position designation accepting means for displaying a cursor on the guidance map image and for accepting designation of a position given by the cursor on the partial map, and the predetermined position may be a position for which the position designation accepting means accepts designation.

This can provide the user with the map covering the vicinity of the position arbitrarily designated by the user's operation of the cursor over a wider range than an area covering the display range previously set, by taking the form of scrolling and displaying the guidance map image as long as the position does not depart from the display range, that is, as long as the user directly recognizes a relationship with the position set by himself/herself from the guidance map image.

Further, the above-mentioned navigation apparatus may comprise the guidance route search device for searching for the route from the present position calculated by the present position calculating device to the destination designated by the user, as the guidance route, and the predetermined position may be a next existing interchange on the guidance route.

This can provide the user with the map covering the vicinity of the next interchange to be traveled, over a wider range than an area covering the display range previously set, by taking the form of scrolling and displaying the guidance map image as long as the interchange does not depart from the display range, that is, as long as the user directly recognizes a relationship with the interchange from the guidance map image.

To solve the foregoing problems, according to another aspect of the present invention, a navigation apparatus mounted on a vehicle includes a present position calculating device for calculating a present position, a map image displaying device for displaying a partial map which is within a display range set on the map, as a guidance map image, together with a present position mark representing the present position on the partial map, when the calculated present position is included within the display range, and scrolling device for setting a first display range with the present position located on an end of the range, and setting the (n+1)th display range in sequence by rotating the nth display range (the n representing a positive integer) by a predetermined angle on the map with the present position set as a center of rotation, in accordance with a user's prescribed operation.

This navigation apparatus can constantly display the present position within the display range, especially at its edge, while rotating the display range with the present position set as a center of rotation. Therefore, this can provide the user with the map covering the present position and its surroundings over the wider range than an area covering the display range originally set, as if the user viewed around the present position.

As mentioned above, the map is displayed so that the user can identify the present position and its surroundings as widely as possible, as well as the relationship with the present position.

DESCRIPTION OF THE PREFERRED EMBODIMENTS

Figure 1:
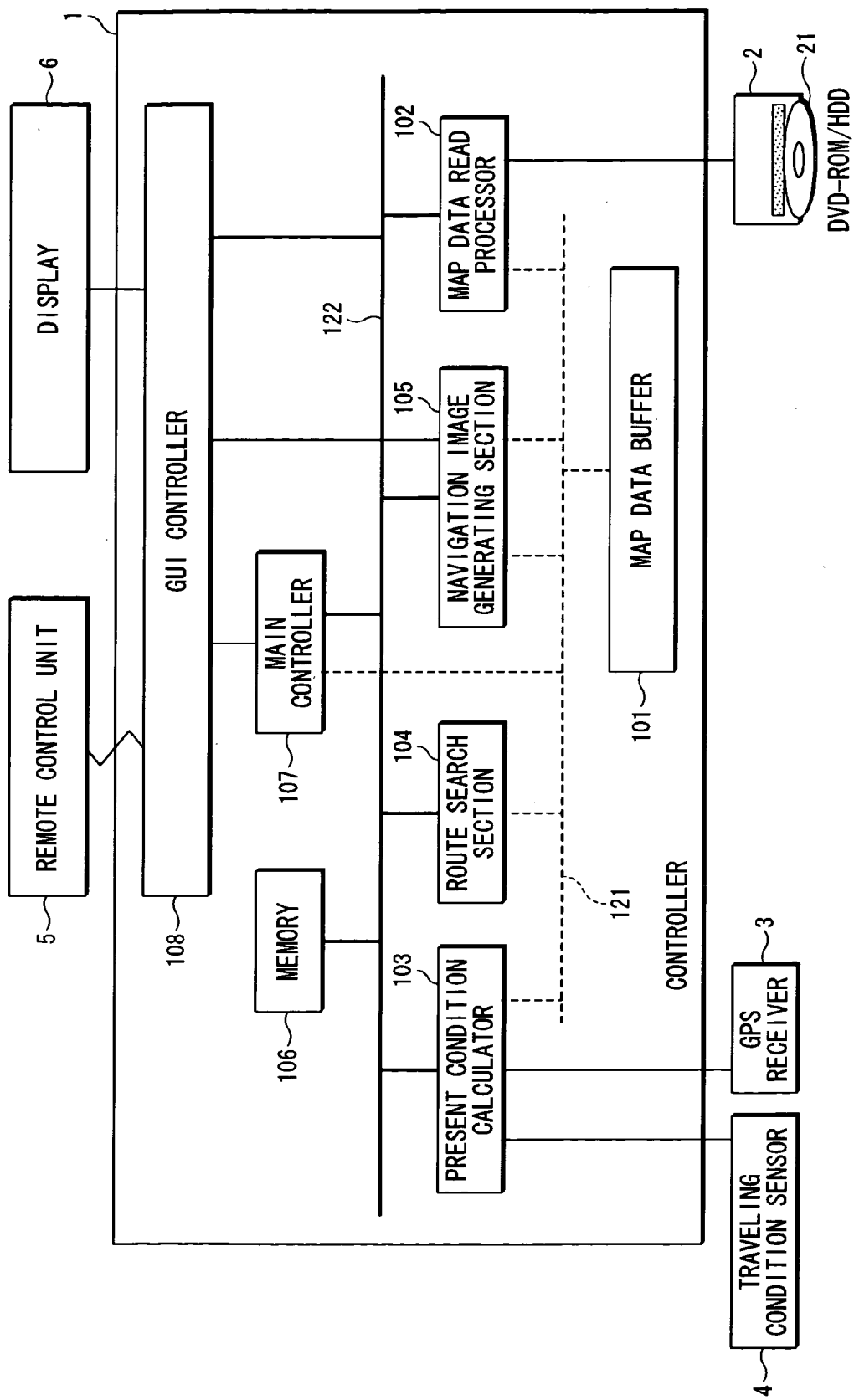
FIG. 1 is a block diagram showing a configuration of a navigation apparatus according to an embodiment of the present invention.

FIG. 1 illustrates a configuration of a navigation apparatus according to an embodiment of the present invention.

As shown in FIG. 1, the present navigation apparatus includes a controller 1, a recording medium drive 2 for accessing a recording medium 21, such as a DVD-ROM, a hard disk, or the like, which stores map data therein, a GPS receiver 3, a traveling condition sensor 4 for detecting a traveling condition of a vehicle, such as an angular acceleration sensor, a vehicle speed sensor, or the like, a remote control unit (remote controller) 5 for accepting input from the user, and a display 6.

The controller 1 includes a map data buffer 101, a map data reading processor 102, a present condition calculator 103, a route search section 104, a navigation image generating section 105, a memory 106, a main controller 107, and a GUI controller 108. In FIG. 1, dotted lines 121 inside the controller 1 each represent an access route from each section to the map data stored in the map data buffer 101. Thick lines 122 represent routes for control information and various kinds of data between sections. Thin lines connected to the GUI controller 108 represent routes for operation information and image information inputted and outputted to and from the user using the remote controller 5 and the display 6.

It should be noted that the above-mentioned controller 1 may be a CPU circuit having a normal structure in terms of hardware, which includes peripheral devices, such as a microprocessor, a memory, a graphic processor, a geometric processor, or the like. In this case, each section of the above-mentioned controller 1 may have its function achieved as an exemplary process by executing programs previously prepared by the microprocessor. Also, in such a case, these programs may be provided to the controller 1 via the recording medium 21 and/or an appropriate communication line.

The configuration of the map data stored in the recording medium 21 is described below.

Map data is managed for predetermined geographic areas by utilizing map sheets. Each map sheet is composed of a plurality of levels with varying degrees of map detail. A map of each level in each map sheet consists of one or more units. Each unit corresponds to a geographic area of the map sheet to which it belongs, or to an area into which the geographic area is divided, and is the map of the corresponding area represented on a level to which the unit itself belongs.

Figure 2:
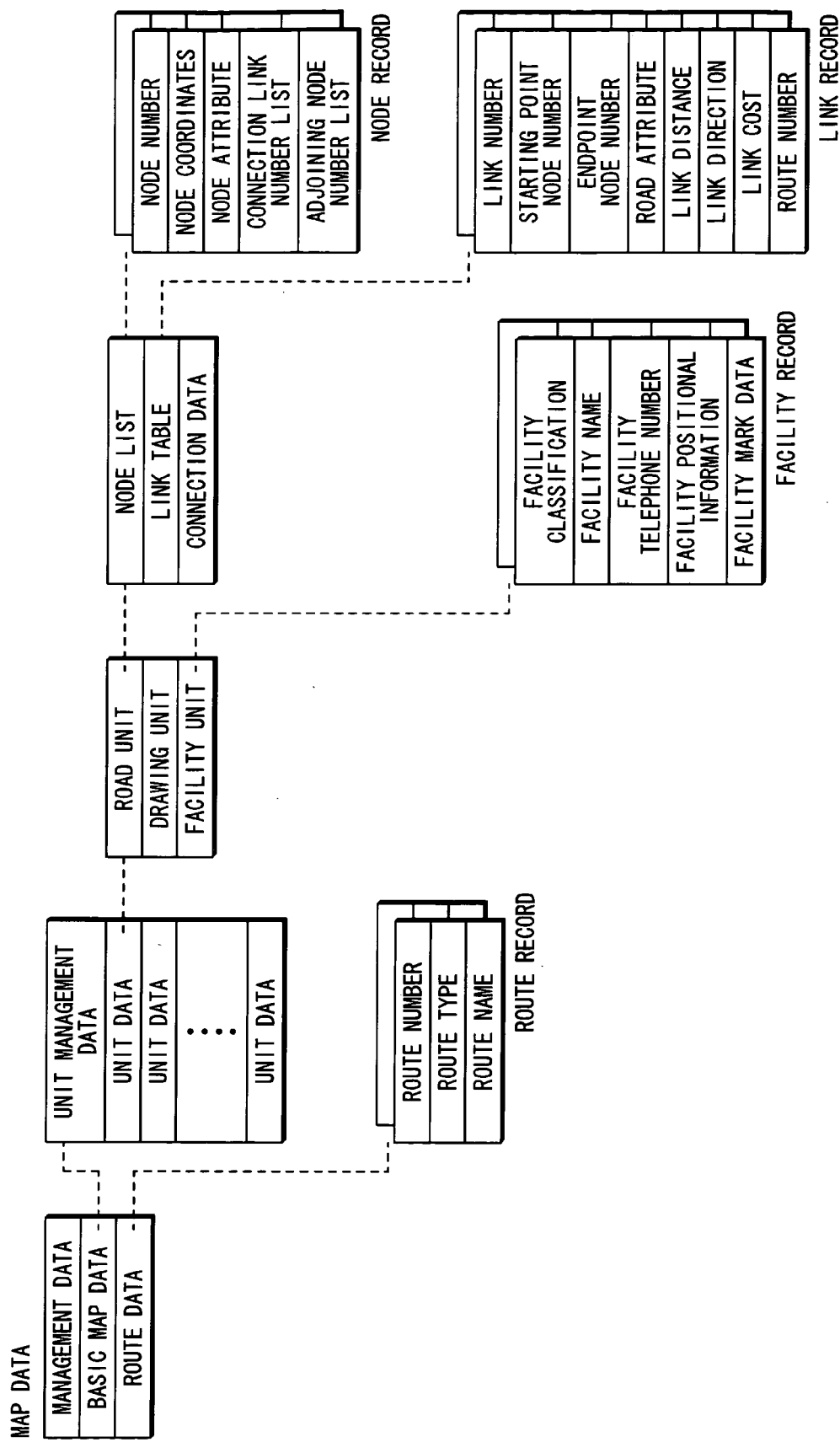
FIG. 2 is a diagram of map data according to an embodiment.

As shown in FIG. 2, the map data is composed of management data indicating the relationship among each unit, the map sheet, the corresponding area and the level, basic map data representing the map, and route data.

The basic map data includes unit data for each unit described above, and unit management data indicating the relationship among each unit data, the map sheet, the corresponding area, and the level. Each unit data includes a road unit representing a road network in the unit, a drawing unit defining a display map in the unit, and a facility unit indicating information on various kinds of facilities in the unit.

The road unit includes a node list, a link table, and connection data for representing connection of nodes and links with other units, and for corresponding relation with the other units.

In the road unit, a road is represented by an assembly of links which are straight lines, and an end of each link is a node. Such nodes are provided on a boundary between adjoining units as well as a connection point of roads, such as an intersection, and an interchange on a freeway. Each link has its own direction. Among two adjoining nodes via a link, there is one link with one transit direction when the road is a one-way road. In contrast, there are two links basically having opposite directions when the road is a two-way road.

The node list includes a node record for each node. The node record includes a node number, node coordinates, a node attribute representing whether the node corresponds to an intersection or interchange on a freeway, a connection link number list, which is a list of numbers of links connected to nodes, and an adjoining node number list, which is a list of numbers of nodes adjoining one another via links.

The link table includes a link record for each link. The link record includes a link number, a starting point node number indicative of the number of nodes, which is a starting point of a link, an endpoint node number that is indicative of the number of nodes, which is an endpoint of a link, a road attribute representing various kinds of information on sections of roads corresponding to links, a length of a link, a direction of a link, a link cost, which is a cost for route search given to a link, and a route number of a route to which the link belongs. The road attributes represented include the type of a road, such as a toll road, a national highway, a prefectural highway, or the like, the width of a road section corresponding to the link, and the number of lanes.

Further, the drawing unit defines a geographical display element for a map, such as a geographical symbol, a road symbol, or the like, character information to be displayed on the map, such as an area name, a facility name, or the like.

The facility unit is data on facilities pre-registered, and has facility records provided for respective present facilities therein. Each facility record includes a facility classification for representing the classification of a corresponding facility, such as a gas station, a hospital, or a convenience store, a facility name of the corresponding facility (fore example, the name of a hospital when the facility is classified as a hospital), a telephone number of the corresponding facility, facility positional information indicative of the position of the corresponding facility, and facility mark data for defining a facility mark to be displayed so as to represent the presence of the facility on the map.

Last but not least, the route data included in the map data has route records provided for respective roads. Each route record includes a route number serving as a road identifier, the type of road, such as a freeway, a national highway, a prefectural highway, or the like, and a route name of each road.

Referring to FIG. 1, the memory 106 stores data indicative of coordinates of a vehicle present position, and data indicative of a present traveling direction of the vehicle. In addition, the memory stores data about a guidance route, which is a route for guiding the user's traveling in the navigation apparatus, and data about the destination and a transit point set by the user.

With such an arrangement, the map data reading processor 102 reads a predetermined range of the map data from the recording medium 21 via the recording medium drive 2 to store the data in the map data buffer 101 under control of the main controller 107.

The present condition calculator 103 repeatedly performs a map matching procedure of a present position, which is estimated based on outputs from the traveling condition sensor 4 and the GPS receiver 3, against the map covering the vicinity of the present position previously determined, and read from the map data buffer 101. Then the calculator repeatedly calculates the most exact position as the present position and a traveling direction to store them in the memory 106.

The main controller 107 accepts setting requests for a destination and a transit point from the user via the remote control unit 5 and the GUI controller 108 to set the destination and the transit point in the memory 106. Then, a guidance route from the present position to the destination via the transit points set is searched for by the route search section 104. The route search section 104 reads from the map data buffer 101 road data about the road unit within the necessary geographical range, and calculates the guidance route from the present position to the destination based on a predetermined cost model using the link cost of the link record, so that route data about the calculated guidance route is stored in the memory 106.

The main controller 107 repeatedly performs a navigation image generating procedure. The main controller 107 sets a direction corresponding to the present traveling direction stored in the memory 106 as a display direction, and determines a scale in accordance with the user's setting and initial setting previously given. The controller then determines a predetermined range around the present position stored in the memory 106 as the display range. The display range is set according to the determined display direction and scale. The display direction is calculated such that the present traveling direction is constantly upward.

The navigation image generating section 105 then performs drawing of map display elements and character rows, which are represented by the drawing unit, based on the drawing unit within the determined display range. The generating section also performs drawing of a facility mark of each facility on a position corresponding to a point designated by facility position information about the facility mark, based on each facility record of the facility data, and drawing of the present position mark, which is directed to a direction corresponding to the present traveling direction, on a position corresponding to the present position. Such drawing procedures are carried out with each determined display direction set upward in the map. When the guidance route is set, the main controller 107 causes the navigation image generating section 105 to draw a guidance route figure, or graphic representing part of the guidance route that is located closer to the destination than the present position represented by the guidance route, within the determined display range with the determined display direction set upward. Also, the main controller 107 causes the navigation image generating section 105 to draw a predetermined destination mark indicative of the position of the destination and a predetermined transit mark indicative of the position of the transit point when the destination and the transit point are included in the display range during route guidance.

The navigation image generating section 105 generates a navigation image by performing the foregoing drawing under the control of the main controller 107 to display it on the display 6 via the GUI controller 108.

Figure 3:
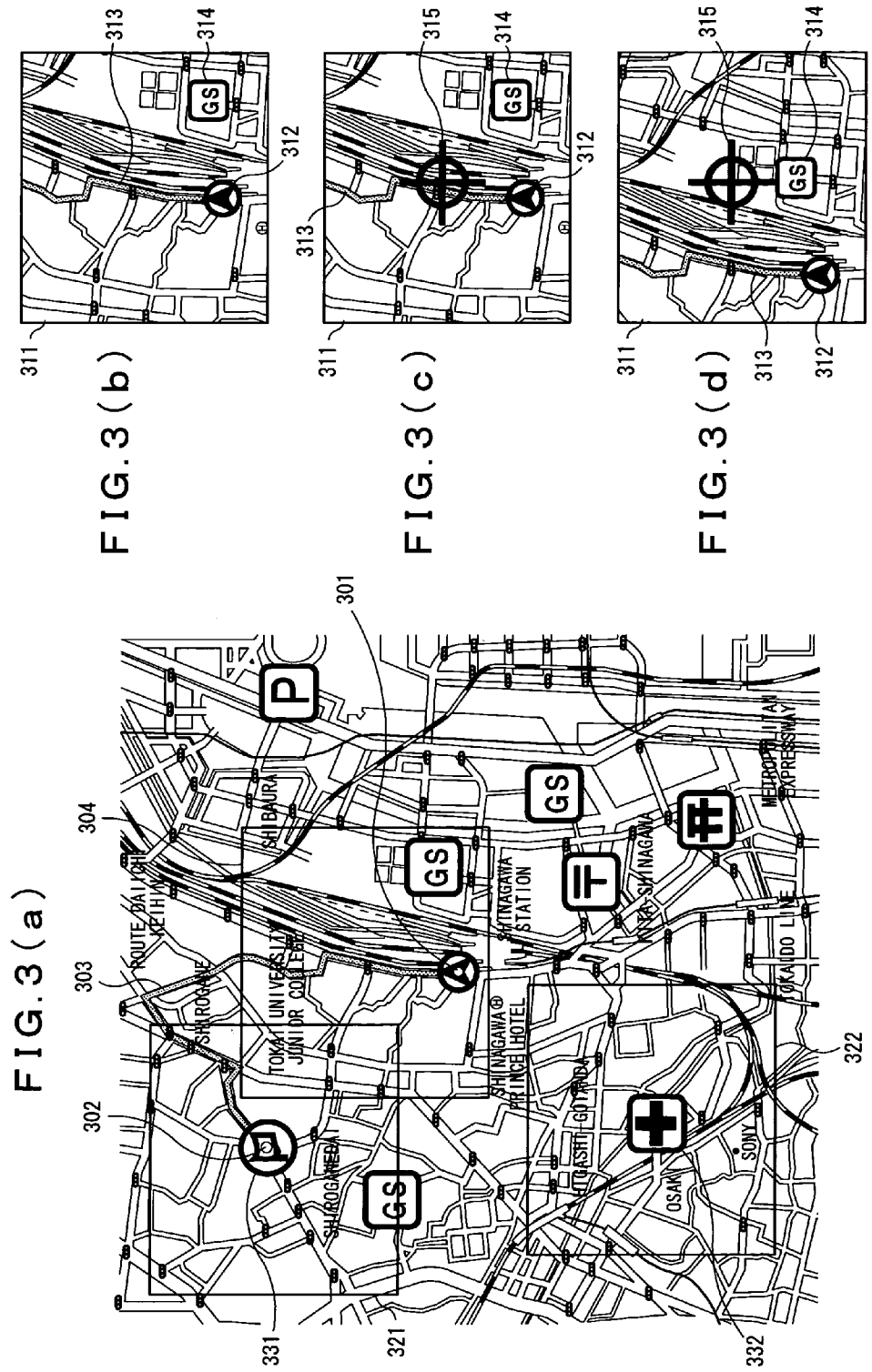
FIG. 3 illustrates an example of display screen images according to an embodiment.

That is, as shown in FIG. 3a, when a point 301 is the present position and a guidance route 303 is set from the present position to the destination 302, a display range 304 is set. The navigation image displayed has a present position mark 312, a guidance route FIG. 313, and a facility mark 314 displayed on a map image 311 with map display elements and various kinds of character rows, as shown in FIG. 3b. Note that while the guidance route is not set and the route guidance is not being given, the above-mentioned guidance route FIG. 313 is not drawn. When the destination is included in the display range, the destination mark is also displayed. In addition, when the transit point is included in the display range, the transit point mark is also displayed.

The main controller 107 checks whether a distance between the present position and the destination stored in the memory 106 reaches a predetermined distance (for example, several tens of meters), during the route guidance as described above. If the predetermined distance is reached, the controller determines that the vehicle is to arrive at the destination, and clears the guidance route, thus terminating the route guidance.

Such a navigation apparatus causes the main controller 107 to carry out the following scrolling display process.

Figure 4:
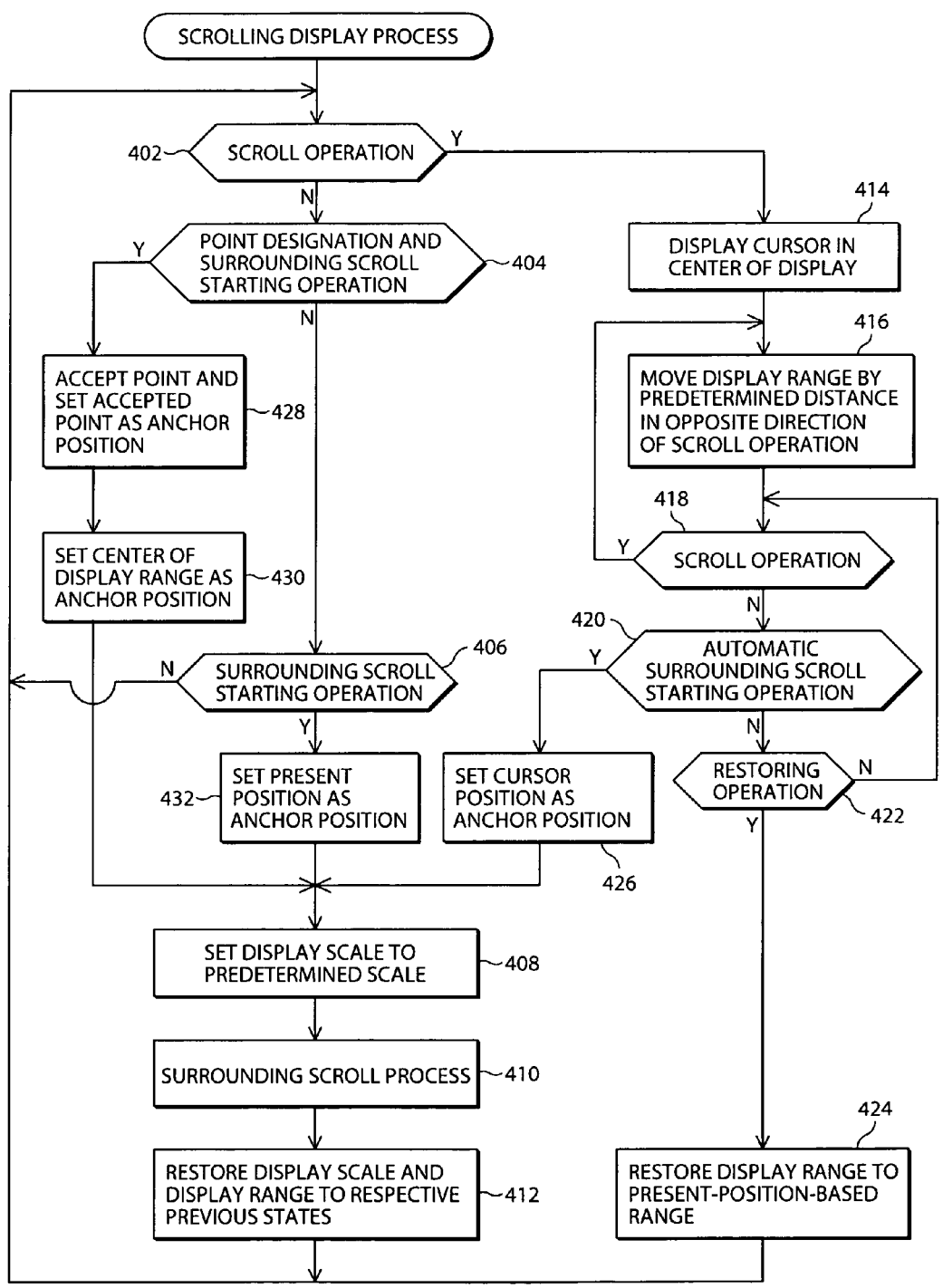
FIG. 4 is a flowchart showing acts in a scrolling display process according to an embodiment.

FIG. 4 illustrates a scrolling display process. This process, checks for the occurrence of a scroll operation performed by the user's manipulation of the remote controller 5 (act 402), a point designation and surrounding scroll starting operation by the controller 5 (act 404), and a surrounding scroll starting operation by the controller 5 (act 406).

When a scroll operation occurs (act 402), for example, a cursor 315 is displayed in the center of the navigation image as shown in FIG. 3c (act 414), and then a display range is moved by a predetermined distance in a direction opposite to the scrolling direction, which is designated by the user's scroll operation (act 416). As a result, when the scrolling direction is to the right, the display of the navigation image is scrolled to the left on the display 6, as shown in FIG. 3d.

Any one of the scroll operation (act 418), the automatic surrounding scroll starting operation (act 420), and the restoring operation (act 422), all of which operations are performed by the user's manipulation of the remote controller 5, is waited. If the scroll operation is continuously performed, the processing from the act 416 is repeatedly carried out, so that the scroll of the navigation image is continued.

On the other hand, if the automatic surrounding scroll starting operation is performed (act 420), a position corresponding to the cursor 315 on the map is set as an anchor position (act 426), and then the operation proceeds to a act 408. If the restoring operation is performed (act 422), the cursor 315 is cancelled, and the display executed on the display 6 is restored to the display of the navigation image within the original display range, which is based on the present position of FIG. 3b (act 424). Thereafter, the operation returns to the act 402.

In a case where the point designation and surrounding scroll starting operation occurs (act 404), selection or designation of a point as an anchor position from a predetermined menu screen manipulated by the user is accepted, and the point designated is set as the anchor position (act 428). A display range of the map is changed or altered such that the anchor position is in the center of the display range (act 430), and then the operation proceeds to act 408.

For example, when a selection menu with selection items including a destination, a transit point, and the like, is displayed, and the destination item is selected on the menu, the point designated as the present destination is set as the anchor position. When the nth transit point is selected on the selection menu, the point designated as the present nth transit point is set as the anchor position. In cases where the present guidance route including a route passing through an interchange is set, a selection item concerning a next interchange may be provided in the selection menu. When the next interchange item is selected, the position of the next interchange to be passed on the guidance route is set as the anchor position.

Further, a list of facility names of all facilities registered in the facility unit of the map data may be displayed, and then selection of the facility name may be accepted on the displayed list. In this case, a point represented by the facility positional information in the facility record of the accepted facility may be set as the anchor position.

Alternatively, a request for a facility search by means of telephone numbers may be accepted. In this case, when a facility record having a telephone number selected or inputted by the user may be extracted, and a point represented by the facility positional information in the extracted facility record may be set as the anchor position.

In FIG. 3a, reference numeral 321 denotes a display range when the destination is set as the anchor position. As a result of such a display range being displayed, reference numeral 331 represents a destination mark expressed in the center of the display screen or viewing area. Reference numeral 322 in FIG. 3a represents a display range when a hospital is set as the anchor position. As a result of such a display range being displayed, reference numeral 332 represents the facility mark of the hospital expressed in the center of the display screen. It should be noted that when the facility position is set as the anchor position, the facility mark indicative of the facility position is displayed such that its center is aligned with the center of the anchor position.

In a case where the surrounding scroll starting operation occurs (act 406), the present position is set as the anchor position (act 432), and then the operation proceeds to a act 408.

In act 408, a display scale of a map is first set to a prescribed scale (for example, 1/3000). Then, a surrounding scroll process is executed (act 410). When the surrounding scroll process is terminated, the display scale of the map is restored to its previous scale, i.e. the scale previous to the scale in the act 410. Simultaneously, the display on the display 6 is restored to its previous display of the navigation image having the original display range (act 412), which is one before starting the act 408. Thereafter, the operation returns to the act 402.

Figure 5:
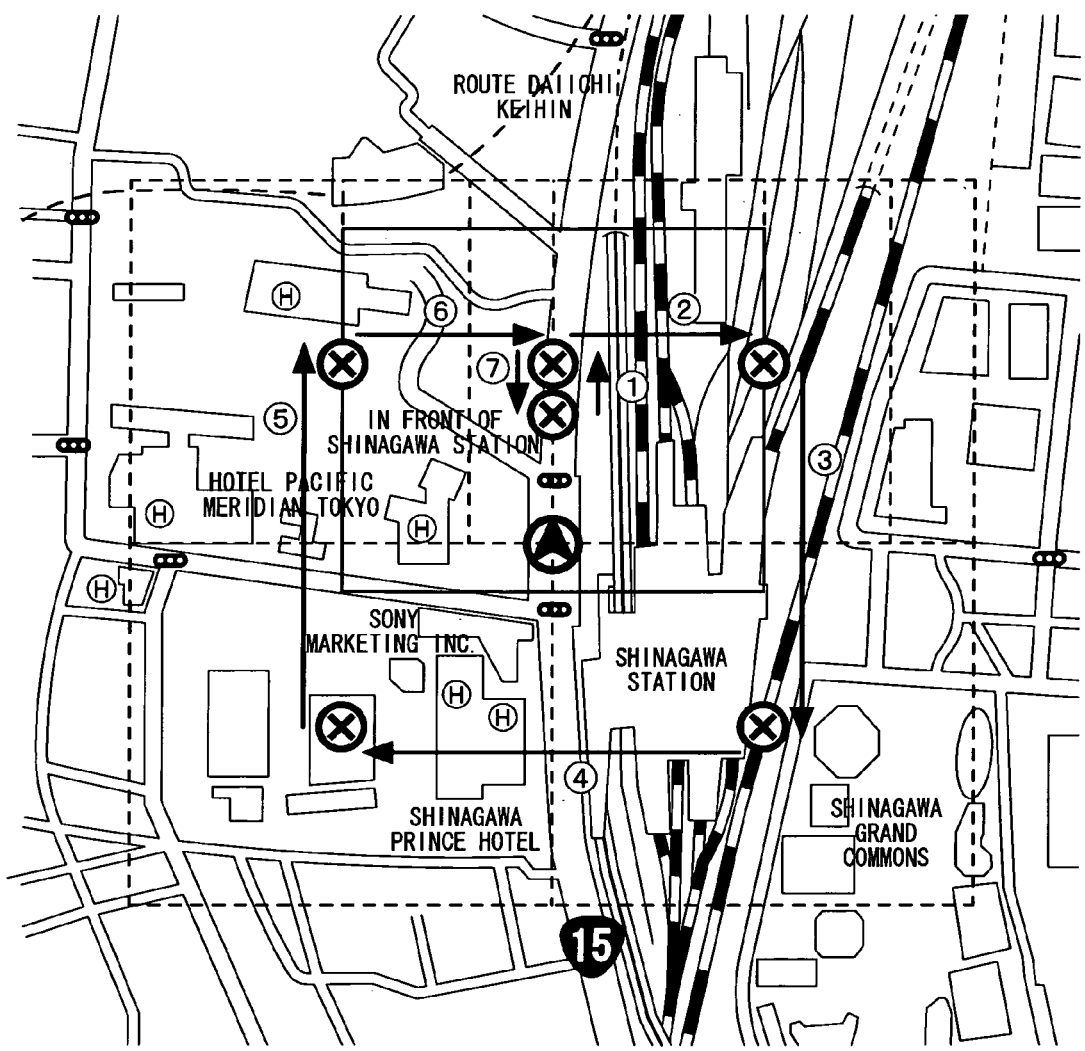
FIG. 5 is a diagram of a scroll operation in a surrounding scroll process according to an embodiment.

The surrounding scroll process performed at the act 410 will now be described in more detail. FIG. 5 illustrates an example of a case where the present position is set as the anchor position. In this surrounding scroll process, the display range is moved in predetermined lengths or distances in the following order. Note that an X mark in a circle denotes a center of the display range, and an arrow between Xs in circles denotes a movement direction of the display range. In the following explanation, a display direction when starting the surrounding scroll process is described as an upward direction (upward direction on the display); a direction opposite to the display direction taken when starting the surrounding scroll process is described as a downward direction; a right direction taken when facing the display direction of the surrounding scroll process is described as a right direction; and a left direction taken when facing the display direction of the process is described as a left direction.

In the surrounding scroll process, the display range is first moved upward until the anchor position is located in the center of a lower hem of the display range (1). Then, the display range is gradually moved rightward until the anchor position is located at a lower left edge of the display range (2). And the display range is gradually moved downward until the anchor position is located at an upper left edge of the display range (3).

Subsequently, the display range is gradually moved left until the anchor position is located at an upper right edge of the display range (4). The display range is gradually moved upward until the anchor position is located at a lower right edge of the display range (5). Then, the display range is gradually moved rightward until the anchor position is also located in the center of the lower hem of the display range (6). Finally, the display range is gradually moved downward until the anchor position returns to the original position where it was located before starting the first surrounding scroll process (7), thus terminating the process.

Figure 6:
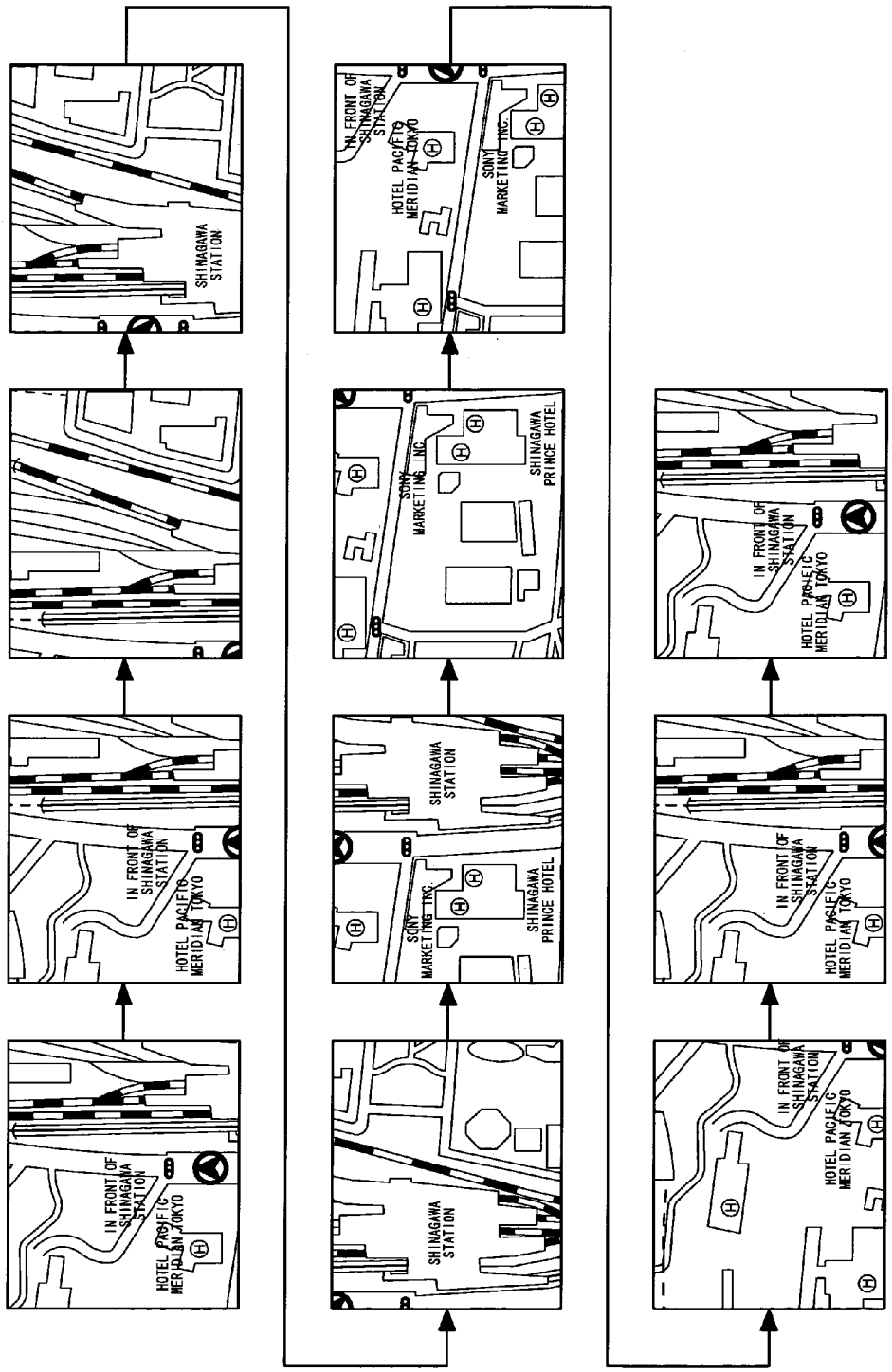
FIG. 6 illustrates an example of display screen images provided by the surrounding scroll process according to an embodiment.

As shown in FIG. 6, illustrating an example in which the present position is set as the anchor position, this surrounding scroll process involves displaying the display range on the display 6 by scrolling the range in a clockwise direction with the anchor position set as a center of rotation. That is, the surrounding scroll process of the present embodiment can constantly display more than one fourth of the mark indicative of the anchor position in the display range, while allowing the user to view a range which is four times as wide as the display range that can be covered by the navigation image at one time, by scrolling the display range with the anchor position set as a center of rotation.

Instead of a scroll sequence that causes the display range to rotate in the clockwise direction with the anchor position set as the center of rotation, another scroll sequence may be employed. As long as more than one fourth of the anchor position mark is constantly displayed, while providing the user with the range which is four times as wide as the display range covered by the navigation image at one time with the anchor position set as the center of rotation, the display range may be scrolled so as to rotate in a counterclockwise direction with the anchor position set as the center of rotation. Thus, any other scroll sequences may be used.

As can be seen from the above embodiments of the invention, once the user executes only the surrounding scroll starting operation, the navigation image can be scrolled over a range around the present position that is four times as wide as the display range displayed by the navigation image at one time, thereby allowing the user to identify the wide range. During scroll of the navigation image, at least one fourth of the present position mark is constantly included in the navigation image, which enables the user to recognize the relationship with the present position from the present position mark, and to identify or confirm the area surrounding the present position.

The automatic surrounding scroll starting operation is performed by the user when the cursor 315 is positioned on a desired spot by the scroll operation of the navigation image, whereby the navigation image is scrolled around the desired spot over a range that is four times as wide as the display range displayed or covered by the navigation image at one time, thus allowing the user to identify or confirm areas within the wide range. During this scroll operation of the navigation image, the navigation image constantly contains at least one fourth of the cursor 315, thereby permitting the user to recognize the relationship with the desired spot by the cursor 315 and to understand the vicinity of the spot.

The point designation and surrounding scroll starting operation is performed for the user to set or designate a desired spot or point such as the destination, a desired facility, a next interchange on a guidance route, or the like, as the anchor position. And this enables scrolling the navigation image around the desired spot over a range that is four times as wide as the display range displayed by the navigation image at one time, thus allowing the user to identify or confirm areas within the range. When the spot designated by the user is the destination or facility, the navigation image constantly contains at least one fourth of a designation mark or a facility mark during the scroll of the navigation image, thereby permitting the user to recognize the relationship with the desired spot designated by these marks and to understand the vicinity of the spot.

In the scroll operation of the navigation image as described above, a scale of the map to be displayed as the navigation image is automatically altered or changed to a scale suitable for viewing the map in detail, so that the user can easily confirm the vicinity of the spot or point serving as the anchor position.

Figure 7:
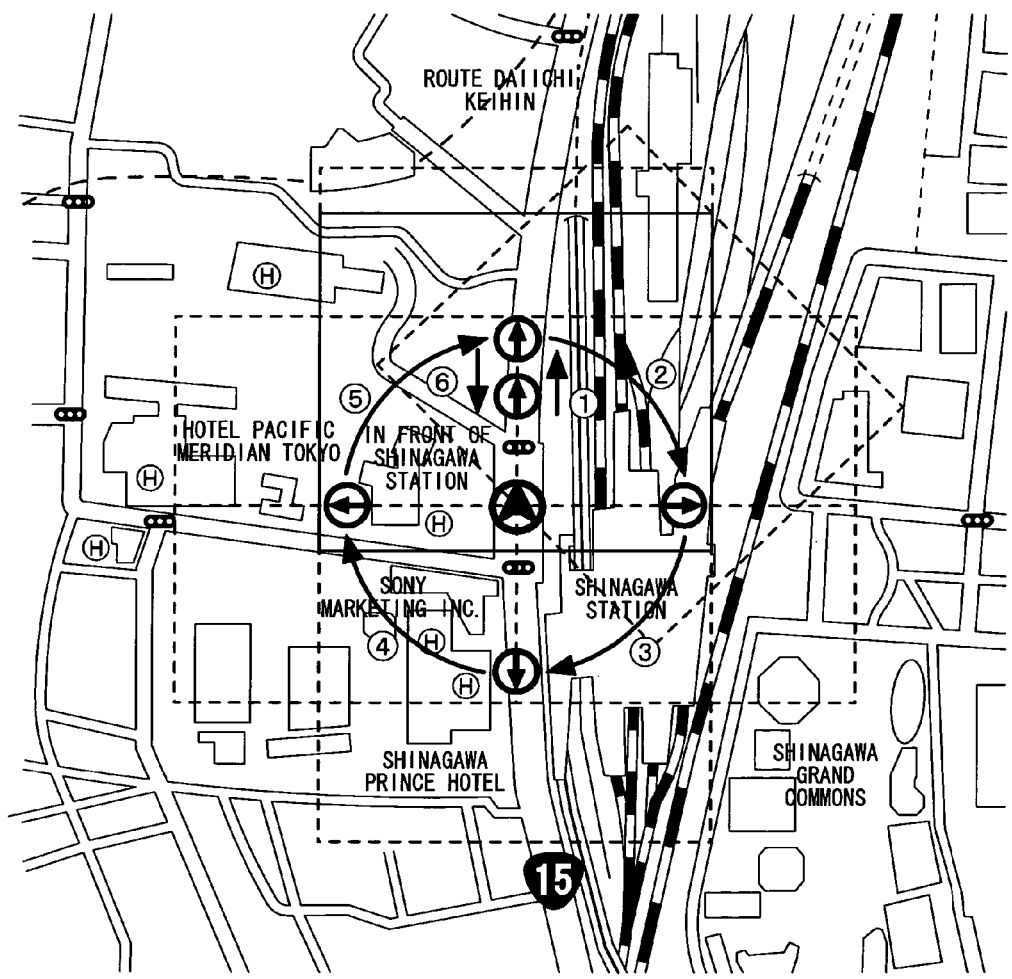
FIG. 7 is an exemplary diagram of a scroll operation in another surrounding scroll process according to another embodiment of the present invention.

As shown in FIG. 7, which illustrates an example in which the present position is set as the anchor position, in the surrounding scroll process, the display range is moved in predetermined lengths and rotated in the following order. Note that a position of an arrow in a circle of the figure denotes a center of the display range, a direction of the arrow in the circle denotes a display direction (upward direction on the display), and an arrow between the arrows in the circles denotes a movement direction of the display range.

In this example, first, the display range is moved upward until the anchor position is located in the center of a lower hem of the display range (1). Then, the display range and the display direction are rotated 360 degrees in stages (2), (3), (4), and (5), in the clockwise direction, with the anchor position set as a center of rotation. Finally, the display range is gradually moved downward until the anchor position returns to the original position where it was located before starting the first surrounding scroll process (6), thus terminating the process.

Figure 8:
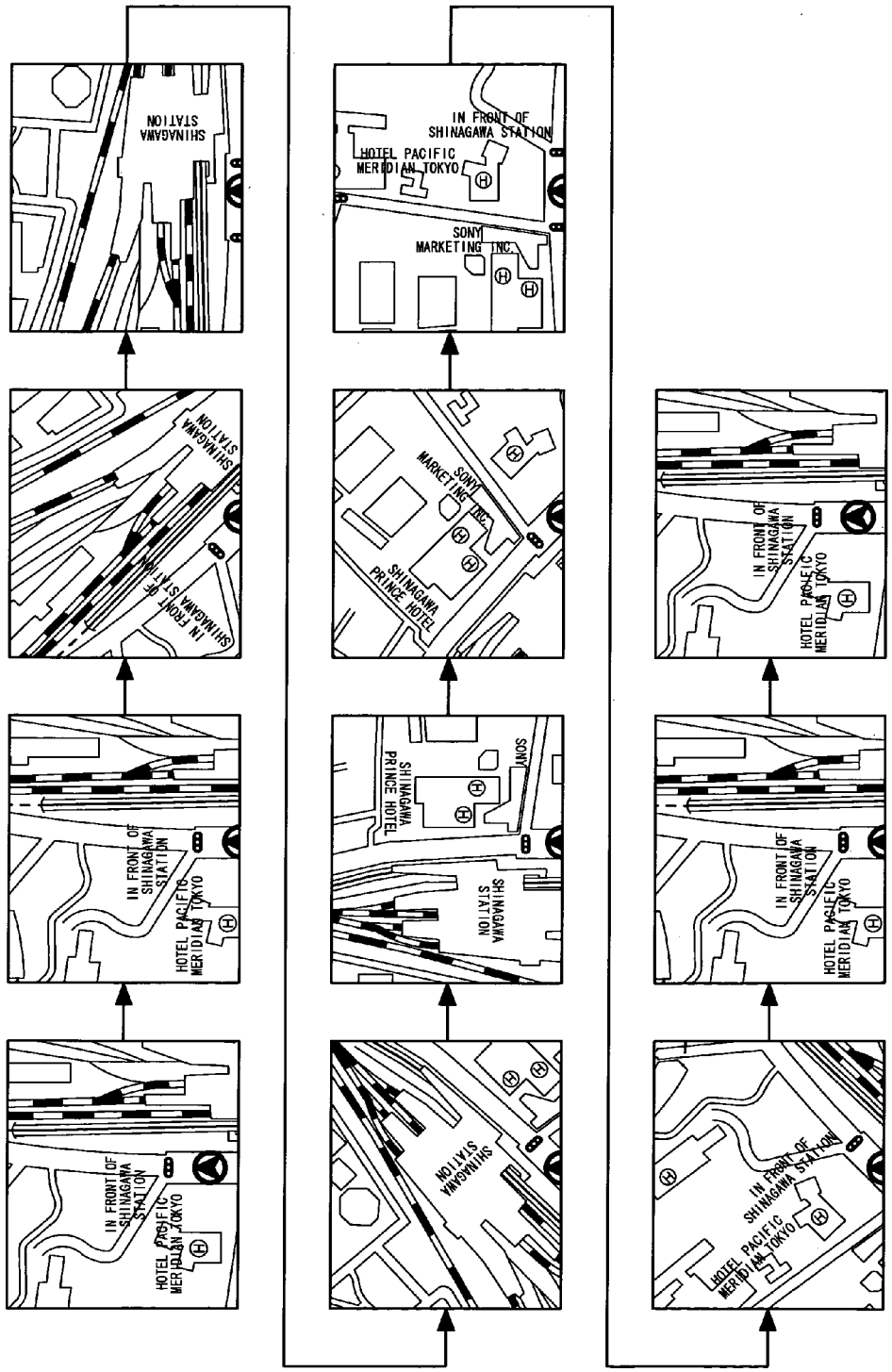
FIG. 8 illustrates an example of display screen images provided by the another surrounding scroll process according to another embodiment.

As shown in FIG. 8, illustrating an example in which the present position is set as the anchor position, this surrounding scroll process involves the display on the display 6, which is obtained when the user views a virtual map every display range viewable at one time, from the anchor position, and consequently views 360 degrees around the anchor position on the virtual map. That is, in this example, the wider range than the display range which can be displayed at one time by the navigation image with the anchor position set as the center of rotation can be provided to the user by the scrolling display, with a half of the anchor position mark constantly displayed.

Figure 9A:
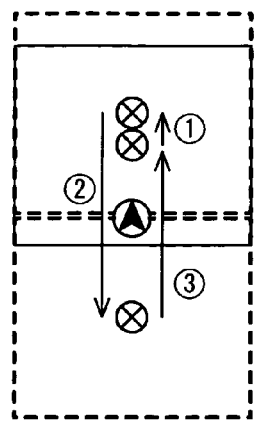
FIG. 9 is an exemplary diagram of a scroll operation in a further surrounding scroll process according to yet another embodiment of the present invention.
Figure 9B:
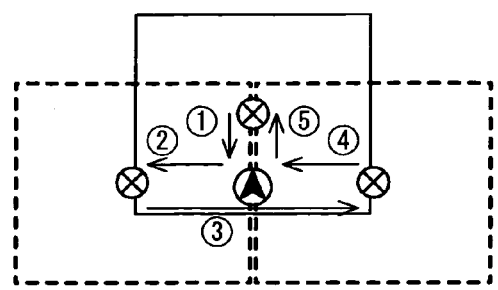

As shown in FIG. 9a, illustrating an example in which the present position is set as the anchor position, the scroll operation may be executed in a longitudinal direction with respect to the anchor position with more than half of the anchor position mark constantly displayed within the display range. Alternatively, as shown in FIG. 9b, illustrating an example in which the present position is set as the anchor position, the scroll operation may be executed in a lateral direction with respect to the anchor position with more than half of the anchor position mark constantly displayed within the display range. Both scroll operations such as those shown in FIG. 9a and FIG. 9b may be carried out.

Figure 9C:
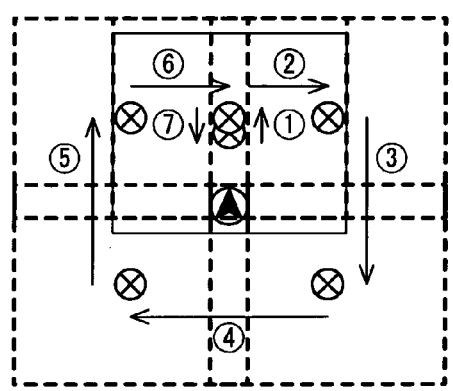
Figure 9D:
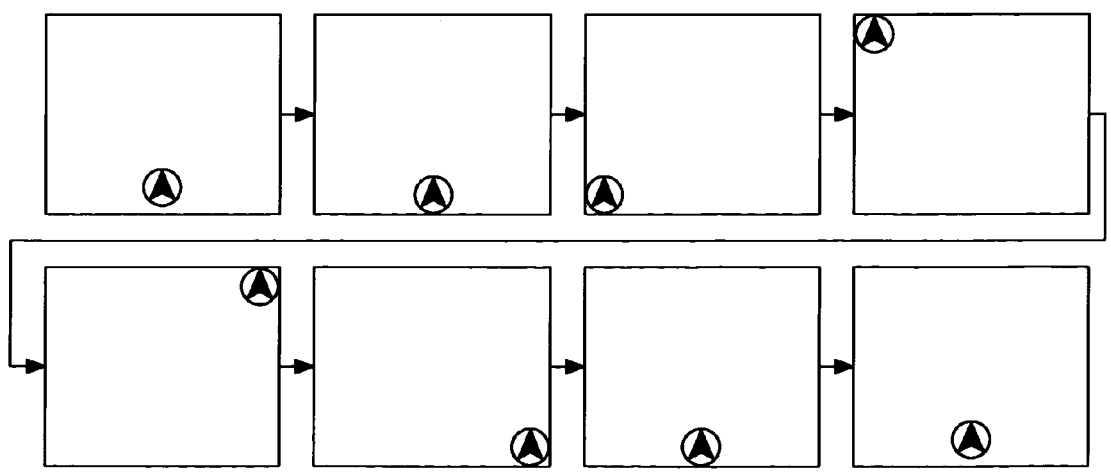

In the above embodiments, any deviation of part of the anchor position mark from the display range is allowed. For example, as shown in FIG. 9c, the display range may be scrolled by the maximum amount that the entire anchor position mark can exist within the display range. This enables the constant display of the entire anchor position mark as shown in FIG. 9d, thereby allowing the user to easily recognize the relationship between the point set as the anchor position and the displayed map.

Although, in the above embodiments, the display range can be moved in accordance with the user's scroll operation without any limitation, the prescribed limit may be placed on the movement of the display range depending on the scroll operation. That is, for example, an amount of movement of the display range performed by the scroll operation may not exceed an amount of movement of the display range performed by the surrounding scroll process in a case where the present position is set as the anchor position.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A navigation apparatus to be mounted on a vehicle, comprising:
    a map image displaying section operable to display a partial map that is within a display range set on a map; and
    a scrolling section operable to move the display range on the map such that a predetermined position on the map is moved from one end to the other of said display range in at least one of a longitudinal and a lateral direction without departing from the display range;
    wherein the partial map provides a guidance map image.

2. The navigation apparatus of claim 1, wherein the map image displaying section is operable to display the partial map as the guidance map image and a position mark representing the predetermined position on the partial map when the predetermined position is included within the display range; and
    wherein the scrolling section is operable to move the display range on the map in the at least one of longitudinal and lateral directions by a maximum amount in which the position mark is displayed in its entirety within the display range.

3. The navigation apparatus of claim 2, further comprising a present position calculator operable to calculate a present position;
    wherein the predetermined position is the present position calculated by the present position calculator and the position mark is a mark representing the present position.

4. The navigation apparatus of claim 2, further comprising a present position calculator operable to calculate a present position and a guidance route search section operable to search for a route from the present position calculated by the present position calculator to a destination designated by the user;
    wherein the predetermined position is the destination, and the position mark is a mark representing the destination.

5. The navigation apparatus of claim 2, wherein the predetermined position is a facility position designated by a user and the position mark is a mark representing the facility designated by the user.

6. The navigation apparatus of claim 1, wherein said scrolling section is operable to move the display range on the map so that the predetermined position is located proximate to an edge of the display range of the map.

7. The navigation apparatus of claim 1, wherein said scrolling section is operable to set a display scale of the partial map serving as the guidance image to a predetermined scale.

8. The navigation apparatus of claim 1, further comprising a present position calculator operable to calculating the present position;
    wherein the predetermined position is the present position calculated by the present position calculator.

9. The navigation apparatus of claim 1, further comprising a present position calculator operable to calculate the present position and a guidance route search section operable to searching for a route from the present position calculated by the present position calculator to a destination designated by a user;
    wherein said predetermined position is said destination.

10. The navigation apparatus of claim 1, wherein the predetermined position is a facility position designated by the user.

11. The navigation apparatus of claim 1, further comprising a position designation accepting section operable to display a cursor on the guidance map image and accept designation of a position given by the cursor on the partial map;
    wherein the predetermined position is a position accepted by the position designation accepting section.

12. The navigation apparatus of claim 1, further comprising a guidance route search section operable to search for a guidance route from the present position calculated by the present position calculator to a destination designated by a user;

wherein said predetermined position is an existing interchange on the guidance route.

13. A navigation apparatus mounted on a vehicle, comprising:
- a present position calculator operable to calculate a present position;
- a map image displaying section operable to display a partial map that is within a display range set on a map and a present position mark representing the present position on the partial map when the calculated present position is included within the display range; and
- a scrolling section operable to set a first display range with the present position located on an end of the display range and set the (n+1)th display range in sequence by rotating the nth display range by a predetermined angle on the map with the present position set as a center of rotation;
- wherein the partial map provides a guidance map image and n represents a positive integer.

14. A method of displaying a map in a navigation apparatus to be mounted on a vehicle, the method comprising the acts of:
- displaying a partial map within a display range set on a map; and
- scrolling the display range on the map such that a predetermined position on the map is moved from a first end to a second end of the display range in at least one of a longitudinal and a lateral direction without departing from the display range;
- wherein the the partial map moved within the display range provides a guidance map image.

15. The method of displaying a map of claim 14, wherein the predetermined position is located within the display range together with a position mark representing the predetermined position on the partial map; and
- wherein the display range is scrolled on the map in said at least one of a longitudinal and a lateral direction of the map by a maximum amount that allows the position mark to be displayed in its entirety within the display range.

16. The method of displaying a map according to claim 14, further comprising the act of calculating a present position wherein the predetermined position is the present position calculated.

17. A method of displaying a map in a navigation apparatus to be mounted on a vehicle, the method comprising the acts of:
- calculating a present position;
- displaying a partial map within a display range set on a map and a present position mark representing the present position on the partial map when the calculated present position is included within said display range; and
- performing a scroll operation, the scroll operation comprising setting a first display range with the present position located on an end of the range, setting the (n+1)th display range in sequence by rotating the nth display range by a predetermined angle on the map with the present position set as a center of rotation, and displaying the partial map that is within the rotated display range and the present position mark on said partial map;
- wherein the partial map provides a guidance map image and n represents a positive integer.

18. The method of claim 17 further comprising the acts of positioning the present position mark in the center of a bottom of the display range, moving the display range such that the present position mark is proximate to the lower left edge of the display range of the map, moving the display range such that the present position mark is proximate to the upper left edge of the display range of the map, moving the display range such that the present position mark is proximate to the upper right edge of the display range of the map, moving the display range such that the present position mark is proximate to the lower right edge of the display range of the map.

19. The method of claim 18 wherein the only a portion of the present position mark is visible when placed proximate to an edge of the display range of the map.

* * * * *